May 9, 1950     A. G. ROSE     2,507,458
ADJUSTABLE PIN FOR RIVETLESS CHAINS
Filed May 7, 1945
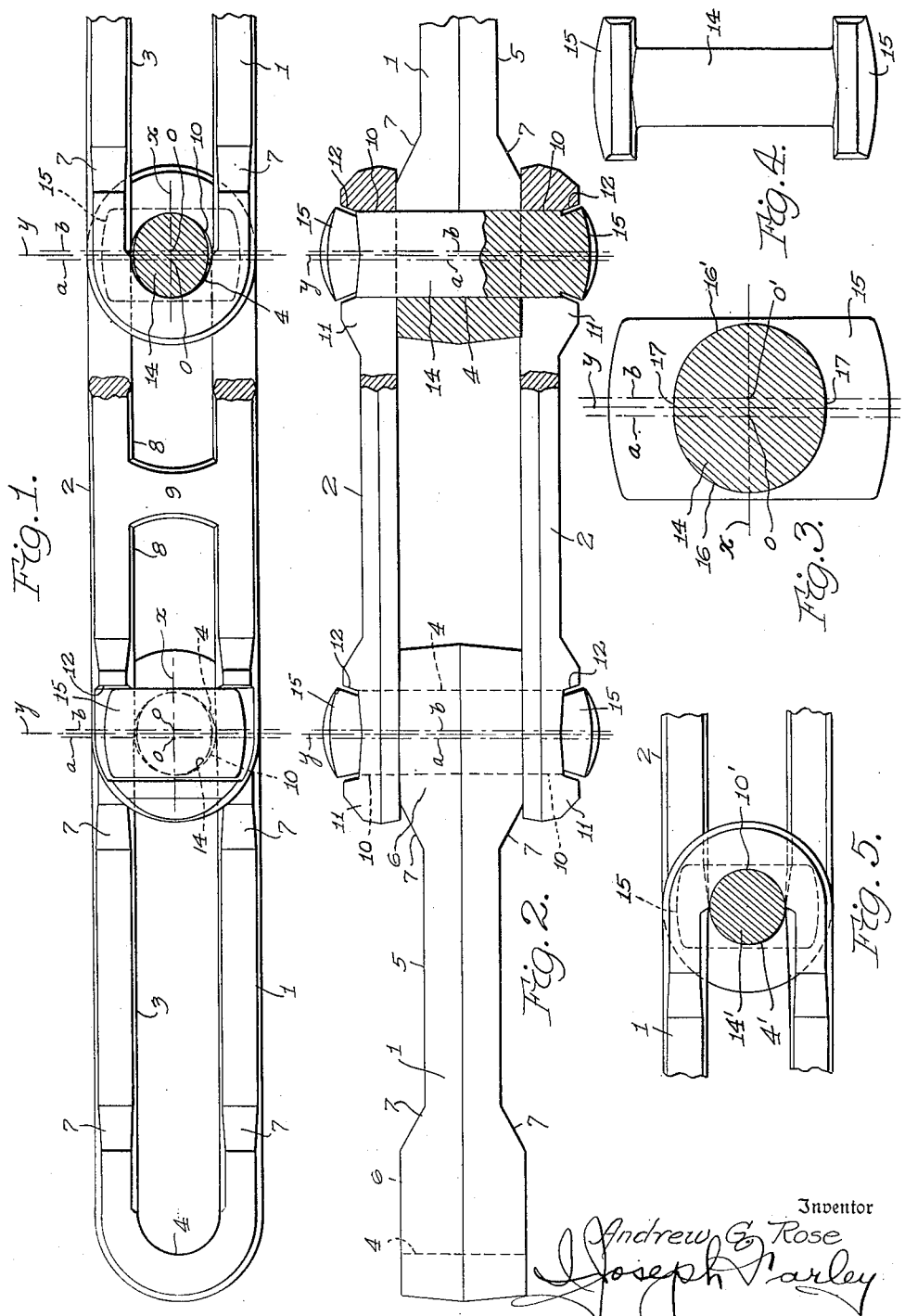
Inventor
Andrew G. Rose
Joseph Narley
Attorney Patented May 9, 1950

2,507,458

UNITED STATES PATENT OFFICE 2,507,458

ADJUSTABLE PIN FOR RIVETLESS CHAINS

Andrew G. Rose, Detroit, Mich., assignor to Jervis B. Webb Company, Detroit, Mich., a corporation of Michigan Application May 7, 1945, Serial No. 592,429

10 Claims. (Cl. 74—249)

This invention relates to a particular type of chain variously called "Keystone," "Rivetless" or "Weston" chain which, for many years, has had wide application in conveyors, mining machinery and other industrial uses.

The original rivetless chain is the subject of the patent to Weston No. 870,704 of November 12, 1907. In addition to its great strength, its principal features are its adaptability as a sprocket chain, the absence of rivets, and the ease with which individual links may be removed from or added to the chain. While other types of chains having the same rivetless feature have been proposed, only the Weston type has been generally accepted in the trade, but the form of the chain has remained without significant change from that originally shown by Weston in 1907.

A chain of this character does not generally require a high degree of precision in its dimensions. There are, however, many modern industrial operations of conveying and assembling materials that are not commercially feasible unless a more accurate chain is provided. Examples of such operations are the transfer of material from one conveyor to another at a specified station and loading or unloading at locations determined within small limits by the position of related machines, receptacles or other apparatus. The principal object of the present invention is to adapt the Weston type of chain to more rigid dimensional requirements than heretofore obtainable, without however requiring more accurate finishing operations throughout the fabrication of the entire chain. This object is accomplished, generally, by the provision of adustable devices at selected points in the length of the chain, such that the distance between any two points in the chain, or between any number of selected points on the chain, may be accurately adjusted.

The original rivetless chain to which the present invention is directed and which is disclosed in the afore-named Weston patent consists of a plurality of alternately arranged "center links" and "side bars" as they are termed in the art. Each center link consists of an integral piece of metal having a pair of laterally spaced side walls joined at their ends by curved end walls, said side and end walls enclosing or forming an elongated slot. A pair of side bars, each having an elongated slot at each end, is pivotally connected to each end of each center link by headed pins, each pin having a transverse head on each end thereof similar to the headed end of a T-head machine bolt. In other words, the chain consists of center links and side bars in alternating relation. The side bars are formed at their ends with transversely extending recesses on their outer faces in which the heads of the pins are seated to lock the pins in position after the center links and side bars have been coupled together. Each of the center links is thinner at the central portion than at the ends. The center links and side bars are assembled by holding a pair of side bars at opposite sides of the thinner portion of a center link, the bars being in parallelism or in alignment with each other and the center lnk, then inserting a headed pin through all three slots, turning the pin 90° to align its head with the transversely extending recesses formed in the side bars, and finally pulling the side bars outwardly on the center link so that the pin rides into the thickened end of the latter, whereby the heads on the ends of the pins become locked in their respective transverse recesses. The double headed pins, having their ends received in their respective transverse recesses in the side bars, are thus prevented from slipping out and also constitute the hinges or knuckles of the chain.

The chain can be dismantled by reversing the order of the aforenamed operation, but it will be recognized in this connection that a loaded chain does not have sufficient slack to permit a center link to turn freely to a position axially perpendicular to the adjacent side bars, as would be necessary in dismantling the chain. Thus, while a free or unloaded chain can easily be dismantled, there is no danger of accidental severing of a chain that is fairly taut on sprocket wheels or other mountings.

In the original Weston chain and the various suggested improvements thereof, each headed connecting pin is cylindrical, and the ends of the elongated slots in the center links and side bars are machine finished to provide a smooth substantially semi-cylindrical bearing for the pin. Thus, the diameter of the pins, together with the length of the links and side bars, determines the over-all length of the fully distended chain or the distance between any two points on the distended chain. No variation in this respect is possible with a cylindrical pin of given diameter. No change in the diameter of the pin is practicable because a pin of different diameter would not fit properly in the arcuate ends of the elongated slots in the center link and side bars.

Within these limitations, the invention nevertheless provides a means for adjusting or shortening the chain in terms of fractions of an inch. The inaccuracy of finish that accompanies a rough-finished chain element, such as a forged link or side bar, may result in a variation of a substantial fraction of an inch in the elongated slot lengths of like parts. The distance between established or selected points on the chain can be calculated reliably only in terms of the minimum slot length. While the errors may offset each other to some extent, the error, if any, in the net result will be an increment to the distance to be fixed. The invention provides a novel type of connecting pin adapted to take up this increment.

The body of the pin is of oval or elliptical cross section. The cross sectional configuration of the pin may be regarded as two 180° arcs having their centers spaced slightly apart on a common bisecting axis. The radius of each of the arcs is equal to the radius of the semi-cylindrical finished bearing formed at the end of the elongated slot in the center link and at each end of the side bars, to be engaged thereby. The ends of the opposed arcs are joined by straight or slightly curved lines substantially parallel to this axis. The spacing of the centers of the arcs may be, for example, on the order of $\frac{1}{32}$ of an inch. The substitution of such a pin for a plain cylindrical pin shortens the chain by the distance between the arc centers, without interfering with the proper fit in the ends of the corresponding elongated slots. The required shortening of the chain between given points is accomplished by substituting the required number of special pins. Some of the pins may have an even smaller arc center distance, for example about $\frac{1}{64}$ inch, to enable an even closer adjustment.

The above and other objects of the invention will appear more fully from the following more detailed description and by reference to the accompanying drawings forming a part hereof and wherein:

Figure 1 is a plan view of a portion of a rivetless chain, partly broken away and partly in section through a connecting pin constructed in accordance with the present invention;

Figure 2 is a side elevation of the structure shown in Figure 1;

Figure 3 is a cross-section of one of the headed pins, in a plane parallel to that of Figure 1;

Figure 4 is a side elevation of the pin, and

Figure 5 is a detail plan section illustrating the conventional cylindrical pin hitherto used.

References to these views will now be made by use of like characters which are employed to designate corresponding parts throughout.

As shown in Figures 1 and 2 which illustrate a fragmentary chain length constructed and assembled according to the invention, the chain consists of center links 1 alternating with side bars 2. The latter occur in pairs, there being two side bars in superimposed relation joining a pair of consecutive spaced links 1.

Each link 1 is an elongated member formed by any suitable process, such as forging, and having an axial elongated slot 3. The wall of the slot is spaced substantially uniformly from the outer wall of the link so that the thickness of the metal, transversely of the slot, is substantially constant. The ends of the slot are formed respectively on uniform arcs 4 of substantially 180° or less and are preferably machined to provide a smooth, cylindrical concave bearing surface at each end of the link.

Between its ends the link is recessed at 5 on both surfaces and on both sides of the slot 3, leaving relatively thicker end portions 6 for a purpose that will presently be described. The link surfaces are preferably sloped at 7 from the ends of the recesses 5 to the adjacent surfaces of the end portions 6.

Each side bar 2 is likewise an elongated member formed with end slots 8 of substantial length axially of the bar and extending substantially to the midpoint of the bar, leaving a transverse bridge or cross-piece 9 as shown in Figure 1. The outer end of each slot 8 is rounded at 10 in a concave arc of substantially 180° and preferably of the same radius as the ends 4 of the center link.

The ends of the side bars are thickened at 11 on one surface to provide for the formation of a transverse slot 12 across each end without unduly weakening the material. Consecutive spaced links 1 are joined by a pair of side bars 2 in superimposed relation, the flat surfaces of the bars having their end portions engaged with the thickened end portions 6 of consecutive links 1 in the assembled chain, whereby the thickened ends 11 of the bars 2 with their transverse slot 12 are disposed in the outer surfaces of the assembled chain.

The chain is assembled as in the prior art. Two side bars 2 are laid with their ends respectively engaging the bottoms of opposite recesses 5 on a center link 1. A fastening pin comprising a shank 14 and T-heads 15 is passed through the aligned slots 3, 8, 8' of the link 1 and the two bars 2 and is positioned in the slots so that the heads 15 lie respectively opposite the transverse recesses 12 and aligned therewith.

The length of the shank 14 between the heads 15 is substantially equal to the thickness of an end-link portion 6 plus twice the thickness of a side bar 2 from the bottom of a recess 12 to the inner or flat surface of the bar. The bars 2 are now slid together, or the center link 1 is slid relatively to the bars, to bring a thickened end portion 6 between the recessed ends of the side bars, without permitting the heads 15 to move out of engagement with the recesses 12. The spreading of the bars in this manner brings the recesses 12 into enclosing or receiving relation to the heads 15. The heads are thus locked in the recesses and this relation is maintained, as previously set forth, until the ends of the bars 2 are moved into the recesses 5 for dismantling. Such movement, however, is not possible so long as the chain is mounted or loaded.

The shank 14 of the pin is approximately but not perfectly cylindrical, as shown more clearly in Figure 3. A cross-sectional area of the shank may be described with reference to two axes X, Y drawn at right angles to each other through the midpoint of the area. The axis X is slightly longer than the axis Y. The periphery of the cross-sectional area includes two opposed convex arcs 16, 16' of approximately 180° or less, having their centers o, o' spaced a slight distance apart on the axis X. The distance between the centers o, o' is the difference in the length of the axes X, Y. The opposed ends of the respective arcs 16, 16' are joined by segments 17 which may be straight lines or curves of large radius. The distance between the centers o, o' or the difference in the length of the axes X, Y is indicated by the projection lines a, b drawn through the centers o, o' in parallel relation to the axis Y.

In the assembled joint the arcs 16, 16' of the pin have a bearing in the slot ends 4, 10, 10' of the center link and side bars. The bearing formed by these slot ends is elongated from a true circle, in the lengthwise direction of the chain by the distance o, o'. The heads 15, as shown in Figure 3, are slightly narrower than the axis X and considerably longer than the axis Y, or nearly as long as the width of the chain elements as shown in Figure 1.

The conventional hinge pin illustrated in Figure 5 has a perfectly cylindrical shank 14' and it fits in the slot ends 4', 10'. In the chain assembled according to this invention, some or even a majority of the connecting pins may be of the character as shown in Figure 5. The special form of pin shown in Figures 1 to 4 is substituted at selected points for the purpose of shortening the chain a predetermined amount. In this connection it may be pointed out that, for purposes of economy, the center links 1 and side bars 2 are not finished with precision accuracy and frequently vary slightly in the over-all length of the corresponding slots 3, 8. Consequently, in a chain assembled in the conventional manner with the pins 14', the distance between a given number of pins on one part of the chain may differ substantially from the distance between the same number of pins on another part of the chain, through an accumulation of errors that may amount to a substantial fraction of an inch or more. In many industrial operations a more accurate registration between certain points on the chain and certain points of other apparatus is required. For example, it may be desired to transfer a load from a given point on one chain to a given point on an intersecting chain. Another example is the case where a given point on a chain must come into register with fixed points of a machine or a series of machines performing work on the load. In setting up a system of apparatus with reference to the distance between two points on the chain, it is first assumed that this distance will incorporate the minimum possible accumulation of positive errors. The actual distance between the two points will, therefore, in most cases exceed the assumed distance. The excess is taken up by substituting the required number of pins 14' with specially formed pins 14, 15. The dimension of a shank 14 lengthwise of the chain exceeds the same dimension of a pin 14' by the distance between the centers o, o'. This distance is on the order of $\frac{1}{32}$ inch. Thus, if an excessive chain length of one-half inch is to be taken up and the distance between the centers o, o' is $\frac{1}{32}$ inch, it will be necessary to replace sixteen pins 14' with special pins 14, 15.

While I have shown a satisfactory constructional example of the present invention, it will be understood that many changes, variations and modifications of the specific constructional details may be resorted to without departing from the spirit of the appended claims.

I claim:

1. In a chain of the type wherein a center link is joined to a pair of transversely aligned side bars straddling an end of the link, said link and bars being slotted lengthwise and the slots shaped concavely at their outer ends, the outer faces of said bars being formed with transverse recesses, and said link being thicker at its ends than between said ends; the combination of two connecting pins each including a shank and a pair of T-heads at its ends, said shank being received in the concave slot ends of said link and pair of bars, said heads being received in a pair of said transverse recesses, said shank of one of said pins having a dimension lengthwise of said slots exceeding twice the radius of said concave slot ends, and said shank of the other of said pins having a corresponding dimension of different magnitude.

2. In a chain of the type wherein a center link is joined to a pair of transversely aligned side bars straddling an end of the link, said link and bars being slotted lengthwise and the slots shaped concavely at their outer ends, the outer faces of said bars being formed with transverse recesses, and said link being thicker at its ends than between said ends; the combination of two connecting pins each including a shank and a pair of T-heads at its ends, said shank being received in the concave slot ends of said link and pair of bars, said heads being received in a pair of said transverse recesses, said shank of one of said pins having a substantially oval cross-sectional area, said area having perpendicular axes intersecting at its center and extending longitudinally and transversely of the chain, the longitudinal axis being longer than the transverse axis, and said shank of the other of said pins having a corresponding longitudinal axis of different magnitude.

3. In a chain of the type wherein a center link is joined to a pair of transversely aligned side bars straddling an end of the link, said link and bars being slotted lengthwise and the slots shaped concavely at their outer ends, the outer faces of said bars being formed with transverse recesses, and said link being thicker at its ends than between said ends; the combination of two connecting pins each including a shank and a pair of T-heads at its ends, said shank being received in the concave slot ends of said link and pair of bars, said heads being received in a pair of said transverse recesses, said shank of one of said pins having a substantially oval cross-sectional area, said area having perpendicular axes intersecting at its center and extending longitudinally and transversely of the chain, the periphery of said area consisting of two arcs of equal radius having their centers in said longitudinal axis at opposite sides of said transverse axis, and lines connecting opposite ends of said arc, and said shank of the other of said pins being of substantially circular cross section.

4. In a chain of the type wherein a center link is joined to a pair of transversely aligned side bars straddling an end of the link, said link and bars being slotted lengthwise and the slots shaped concavely at their outer ends, the outer faces of said bars being formed with transverse recesses, and said link being thicker at its ends than between said ends; the combination of two connecting pins each including a shank and a pair of T-heads at its ends, said shank being received in the concave slot ends of said link and pair of bars, said heads being received in a pair of said transverse recesses, said shank of one of said pins having a substantially oval cross-sectional area, said area having perpendicular axes intersecting at its center and extending longitudinally and transversely of the chain, the periphery of said area consisting of two arcs of equal radius having their centers in said longitudinal axis at opposite sides of said transverse axis, and lines connecting opposite ends of said arc, the radius of said concave slot ends being at least equal to the radius of said arcs, and said shank of the other of said pins having a substantially circular cross section.

5. In a chain of the type wherein a center link is joined to a pair of transversely aligned side bars straddling an end of the link, said link and bars being slotted lengthwise and the slots shaped concavely at their outer ends, the outer faces of said bars being formed with transverse recesses, and said link being thicker at its ends than between said ends; the combination of a plurality of connecting pins each including a shank and a pair of T-heads at its ends, said shank being received in the concave slot ends of said link and pair of bars, said heads being received in a pair of said transverse recesses, said shank of certain of said pins having a substantially oval cross-sectional area, said area having perpendicular axes intersecting at its center and extending longitudinally and transversely of the chain, the periphery of said area consisting of two arcs of equal radius having their centers in said longitudinal axis at opposite sides of said transverse axis, lines connecting opposite ends of said arc, said arcs not exceeding 180° each, and said shank of other of said pins having a cross sectional dimension longitudinal of said chain of different magnitude from that of said first-mentioned pins.

6. In a chain of the type wherein a center link is joined to a pair of transversely aligned side bars straddling an end of the link, said link and bars being slotted lengthwise and the slots shaped concavely at their outer ends, the outer faces of said bars being formed with transverse recesses, and said link being thicker at its ends than between said ends; the combination of a plurality of connecting pins each including a shank and a pair of T-heads at its ends, said shank being received in the concave slot ends of said link and pair of bars, said heads being received in a pair of said transverse recesses, said shank of certain of said pins having a substantially oval cross-sectional area, said area having perpendicular axes intersecting at its center and extending longitudinally and transversely of the chain, the periphery of said area consisting of two arcs of equal radius having their centers in said longitudinal axis at opposite sides of said transverse axis, lines connecting opposite ends of said arc, said arcs not exceeding 180° each, the radius of said concave slot ends being at least equal to the radius of said arcs, and said shank of other of said pins having a cross sectional dimension longitudinal of said chain of different magnitude from that of said first-mentioned pins.

7. In a chain of the type wherein adjacent links provided with longitudinally extending slots shaped concavely at their outer ends are joined by connecting pins received in said slots, means for adjusting the length between given points in said chain characterized by a plurality of connecting pins having different cross sectional dimensions whereby various combinations of the different sized connecting pins located between said points will provide adjustable variation in the length therebetween.

8. In a chain of the type wherein adjacent links provided with longitudinally extending slots shaped concavely at their outer ends are joined by connecting pins received in said slots, the outer faces of said links being formed with transverse recesses, and each of said connecting pins being formed with a shank and a pair of T-heads at its ends, said heads being received in said transverse recesses; means for adjusting the length between given points in said chain characterized by said connecting pins being normally formed with a given cross section adapted to seat in said concave slot ends, and certain of said connecting pins being formed with a relatively elongated cross section in a manner whereby the subsitution of one or more of said latter pins for the normal pins located between said points will progressively shorten the length between said points.

9. In a chain of the type wherein a center link is joined to a pair of transversely aligned side bars straddling an end of the link, said link and bars being slotted lengthwise and the slots shaped concavely at their outer ends, the outer faces of said bars being formed with transverse recesses, and said link being thicker at its ends than between said ends; the combination of alternative connecting pins each including a shank and a pair of T-heads at its ends, said shank being received in the concave slot ends of said link and a pair of bars, said heads being received in a pair of said transverse recesses, said alternative pins having different shank dimensions lengthwise of said slots whereby the length of said chain between two given points may be adjusted through the selection of various combinations of said alternative connecting pins.

10. A chain as set forth in claim 9 wherein said connecting pin shanks are normally circular in cross section, alternative connecting pins being provided with integral shanks of a cross section bounded by a pair of opposed convex arcs having their centers spaced apart somewhat in a direction lengthwise of said slots and tangential lines joining the ends of said semi-circles, the substitution of one or more of said latter connecting pins for the normal pins located between said points will progressively shorten the length of said chain between such points.

ANDREW G. ROSE.

REFERENCES CITED

The following references are of record in the file of this patent:

UNITED STATES PATENTS

| Number | Name | Date |
|---|---|---|
| 870,704 | Weston | Nov. 12, 1907 |
| 1,122,831 | Wilmot et al. | Dec. 29, 1914 |
| 1,193,550 | Hovland | Aug. 8, 1916 |
| 1,743,157 | Morse | Jan. 14, 1930 |
| 2,310,016 | Doberstein | Feb. 2, 1943 |
| 2,365,911 | Simmons | Dec. 26, 1944 |